US009896231B2

(12) United States Patent
Pettersson

(10) Patent No.: US 9,896,231 B2
(45) Date of Patent: Feb. 20, 2018

(54) PACKAGING STATION SYSTEM AND RELATED METHODS

(71) Applicant: PACKSIZE LLC, Salt Lake City, UT (US)

(72) Inventor: Niklas Pettersson, Vasteras (SE)

(73) Assignee: Packsize, LLC, Salt Lake City, UT (US)

( * ) Notice: Subject to any disclaimer, the term of this patent is extended or adjusted under 35 U.S.C. 154(b) by 682 days.

(21) Appl. No.: 14/370,738

(22) PCT Filed: Jan. 3, 2013

(86) PCT No.: PCT/US2013/020153
§ 371 (c)(1),
(2) Date: Jul. 3, 2014

(87) PCT Pub. No.: WO2013/106231
PCT Pub. Date: Jul. 18, 2013

(65) Prior Publication Data

US 2015/0005926 A1 Jan. 1, 2015

Related U.S. Application Data

(60) Provisional application No. 61/584,579, filed on Jan. 9, 2012.

(51) Int. Cl.
*G06F 7/00* (2006.01)
*B65B 59/00* (2006.01)
(Continued)

(52) U.S. Cl.
CPC ................ *B65B 59/00* (2013.01); *B65B 5/02* (2013.01); *B65B 43/265* (2013.01); *B65B 67/02* (2013.01); *B31B 50/10* (2017.08); *B65B 2210/04* (2013.01)

(58) Field of Classification Search
None
See application file for complete search history.

(56) References Cited

U.S. PATENT DOCUMENTS 4,656,591 A * 4/1987 Goldberg ............... G06K 17/00 235/385
5,265,398 A * 11/1993 VanAlstine ............. B65B 19/34 53/148

(Continued)

FOREIGN PATENT DOCUMENTS

WO 2011072253 6/2011
WO WO 2011072253 A1 * 6/2011 ............. B65B 5/024
WO 2013106231 7/2013

OTHER PUBLICATIONS

Packsize, Understanding on Demand Packaging, YouTube, Dec. 21, 2011, [retrieved on Apr. 30, 2013], Retrieved from Internet: < URL: http://www.youtube.com/watch?feature=player_embedded&v-6iYmpRZycPQ >.

(Continued)

*Primary Examiner* — Yolanda R Cumbress
(74) *Attorney, Agent, or Firm* — Workman Nydegger

(57) ABSTRACT

Implementations of the present invention relate to systems and methods for processing paperboard and similar fanfold materials into packaging templates and packaging orders using the packaging templates. More specifically, the described embodiments relate to methods of processing orders available for packaging, such as to reduce the time and cost of producing custom-size packaging templates, building custom-sized packaging boxes, and packaging orders in the boxes.

21 Claims, 6 Drawing Sheets

(51) Int. Cl.

| | |
|---|---|
| ***B65B 43/26*** | (2006.01) |
| ***B65B 67/02*** | (2006.01) |
| ***B65B 5/02*** | (2006.01) |
| *B31B 50/10* | (2017.01) |

(56) References Cited

U.S. PATENT DOCUMENTS

| | | | | |
|---|---|---|---|---|
| 7,810,724 | B2 | 10/2010 | Skaaksrud et al. | |
| 8,406,917 | B2 * | 3/2013 | Khan | B25J 9/1687 700/217 |
| 8,560,461 | B1 * | 10/2013 | Tian | G06Q 10/087 705/332 |
| 8,639,382 | B1 | 1/2014 | Clark et al. | |
| 2001/0005968 | A1 | 7/2001 | Mills | |
| 2004/0193466 | A1 | 9/2004 | Kull et al. | |
| 2006/0242024 | A1 | 10/2006 | Mattingly | |
| 2008/0020916 | A1 * | 1/2008 | Magnell | B65B 5/02 493/65 |
| 2009/0313948 | A1 | 12/2009 | Buckley et al. | |
| 2013/0000252 | A1 | 1/2013 | Pettersson et al. | |
| 2013/0247519 | A1 | 9/2013 | Clark | |
| 2013/0291493 | A1 * | 11/2013 | Laudet | B65B 5/08 53/475 |
| 2014/0038802 | A1 | 6/2014 | Clark | |
| 2015/0005926 | A1 | 1/2015 | Pettersson et al. | |

OTHER PUBLICATIONS

United States Search Authority, International Search Report and Written Opinion, Completed Apr. 30, 2013, dated May 15, 2013.
International Search Report and Written Opinion for PCT/US2015/51933 dated Dec. 22, 2015.
European Search Report for EP13736159 dated Jun. 9, 2015.
European Search Report for EP13736159 dated Mar. 8, 2017.
“Packsize on Demand Packaging for the Furniture Industry—Company: Hunger—German” YouTube Oct. 26, 2011.
“Packsize Helps Leading Fulfilment Company Reduce Costs” YouTube Aug. 12, 2011.
“Packsize on Demand Packaging fur die Movelindustrie—Fa Ludewig” YouTube Oct. 27, 2011.
U.S. Appl. No. 14/502,980, dated Jul. 5, 2017, Office Action.

* cited by examiner

PACKAGING STATION SYSTEM AND RELATED METHODS

CROSS-REFERENCE TO RELATED APPLICATIONS

This application claims priority to and the benefit of PCT Application No. PCT/US2013/0020153, filed Jan. 3, 2013, entitled "PACKAGING STATION SYSTEM AND RELATED METHODS", which claims the benefit of and priority to the following applications: U.S. Provisional Application No. 61/584,579, filed Jan. 9, 2012, entitled "PACKAGING STATION SYSTEM AND RELATED METHODS". All the aforementioned applications are incorporated by reference herein in their entirety.

BACKGROUND

1. Technical Field

Exemplary embodiments of the invention relate to systems, methods, and devices for packaging orders. More specifically, exemplary embodiments relate to systems and methods for initiating requests for packaging templates and packaging orders.

2. Background and Relevant Art

Shipping and packaging industries frequently use paperboard and other fanfold material processing equipment that converts fanfold materials into box templates. One advantage of such equipment is that a shipper may prepare boxes of required sizes as needed in lieu of keeping a stock of standard, pre-made boxes of various sizes. Consequently, the shipper can eliminate the need to forecast its requirements for particular box sizes as well as to store pre-made boxes of standard sizes. Instead, the shipper may store one or more bales of fanfold material, which can be used to generate a variety of box sizes based on the specific box size requirements at the time of each shipment. This allows the shipper to reduce storage space normally required for periodically used shipping supplies as well as reduce the waste and costs associated with the inherently inaccurate process of forecasting box size requirements, as the items shipped and their respective dimensions vary from time to time.

In addition to reducing the inefficiencies associated with storing pre-made boxes of numerous sizes, creating custom sized boxes also reduces packaging and shipping costs. In the fulfillment industry it is estimated that shipped items are typically packaged in boxes that are about 40% larger than the shipped items. Boxes that are too large for a particular item are more expensive than a box that is custom sized for the item due to the cost of the excess material used to make the larger box. When an item is packaged in an oversized box, filling material (e.g., Styrofoam, foam peanuts, paper, air pillows, etc.) is often placed in the box to prevent the item from moving inside the box and to prevent the box from caving in when pressure is applied (e.g., when boxes are taped closed or stacked). These filling materials further increase the cost associated with packing an item in an oversized box.

Custom-sized boxes also reduce the shipping costs associated with shipping items compared to shipping the items in oversized boxes. A shipping vehicle filled with boxes that are 40% larger than the packaged items is much less cost efficient to operate than a shipping vehicle filled with boxes that are custom sized to fit the packaged items. In other words, a shipping vehicle filled with custom sized packages can carry a significantly larger number of packages, which can reduce the number of shipping vehicles required to ship that same number of items. Accordingly, in addition or as an alternative to calculating shipping prices based on the weight of a package, shipping prices are often affected by the size of the shipped package. Thus, reducing the size of an item's package can reduce the price of shipping the item.

Although sheet material processing machines and related equipment can potentially reduce inconveniences and costs associated with stocking and using standard sized shipping supplies, the process for making and using custom-made, just-in-time packaging templates can nevertheless be improved through the order in which the packaging templates are created and used.

BRIEF SUMMARY OF THE INVENTION

This disclosure relates to systems, methods, and devices for processing paperboard (such as corrugated cardboard) and similar fanfold materials and converting the same into packaging templates. In connection with a packaging system that includes a converting machine that makes packaging templates that may be assembled into custom sized boxes, this disclosure relates to a method for packaging multiple groups of one or more items. Such method can include initiating a packaging process for a first group of one or more items and initiating a packaging process for a second group of one or more items. The method also can include completing the packaging process for the first group of one or more items after initiating the packaging process for the second group of one or more items. Moreover, the method can also include initiating a packaging process for a third group of one or more items and completing the packaging process for the second group of one or more items after initiating the packaging process for the third group of one or more items.

In at least one embodiment, a method for utilizing a converting machine in a packaging system for packaging orders can include checking for orders available for packaging and, if available, initiating two available orders for processing, including requesting the creation by the converting machine of packaging templates for the two available orders. Such method also can include checking for a created packaging template for at least one of the two available orders and, if available, completing the processing of the at least one of the two available orders. Additionally, the method can include checking for orders available for packaging and, if available, initiating one available order for processing, including requesting the creation by the converting machine of a packaging template for the one available order. Moreover, the method can incorporate checking for a created packaging template for the other of the two available order and, if available, completing the processing of the other of the two available orders. The method also can incorporate checking for a created packaging template for the one available order and, if available, completing the processing of the one available order.

In yet another embodiment, a method for utilizing a packaging system for requesting packaging materials, assembling packages, and preparing packages for shipment can include obtaining dimensions of a first order and requesting a first packaging template to be prepared by the packaging system based on the obtained dimensions of the first order. The method also can include obtaining dimensions of a second order and requesting a second packaging template to be prepared by the packaging system based on the obtained dimensions of the second order. Additionally, the method can include assembling the first packaging template into a first box and packaging the first order therein.

Furthermore, the method can include obtaining dimensions of a third order and requesting a third packaging template to be prepared by the packaging system based on the obtained dimensions of the third order. Such method also can incorporate assembling the second packaging template into a second box and packaging the second order therein. Still further, the method can include obtaining dimensions of a fourth order and requesting a fourth packaging template to be prepared by the packaging system based on the dimensions of the fourth order. Additionally, the method can include assembling the third packaging template into a third box and packaging the third order therein.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. For better understanding, like elements have been designated by like reference numbers throughout the various accompanying figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The embodiments described herein generally relate to systems and methods for processing paperboard and similar fanfold materials into packaging templates and packaging orders using the packaging templates. More specifically, the described embodiments relate to methods of processing orders available for packaging. In one or more implementations, the method can reduce the time and cost of producing custom-size packaging templates, building custom-sized packaging boxes, and packaging orders in the boxes.

Figure 1:
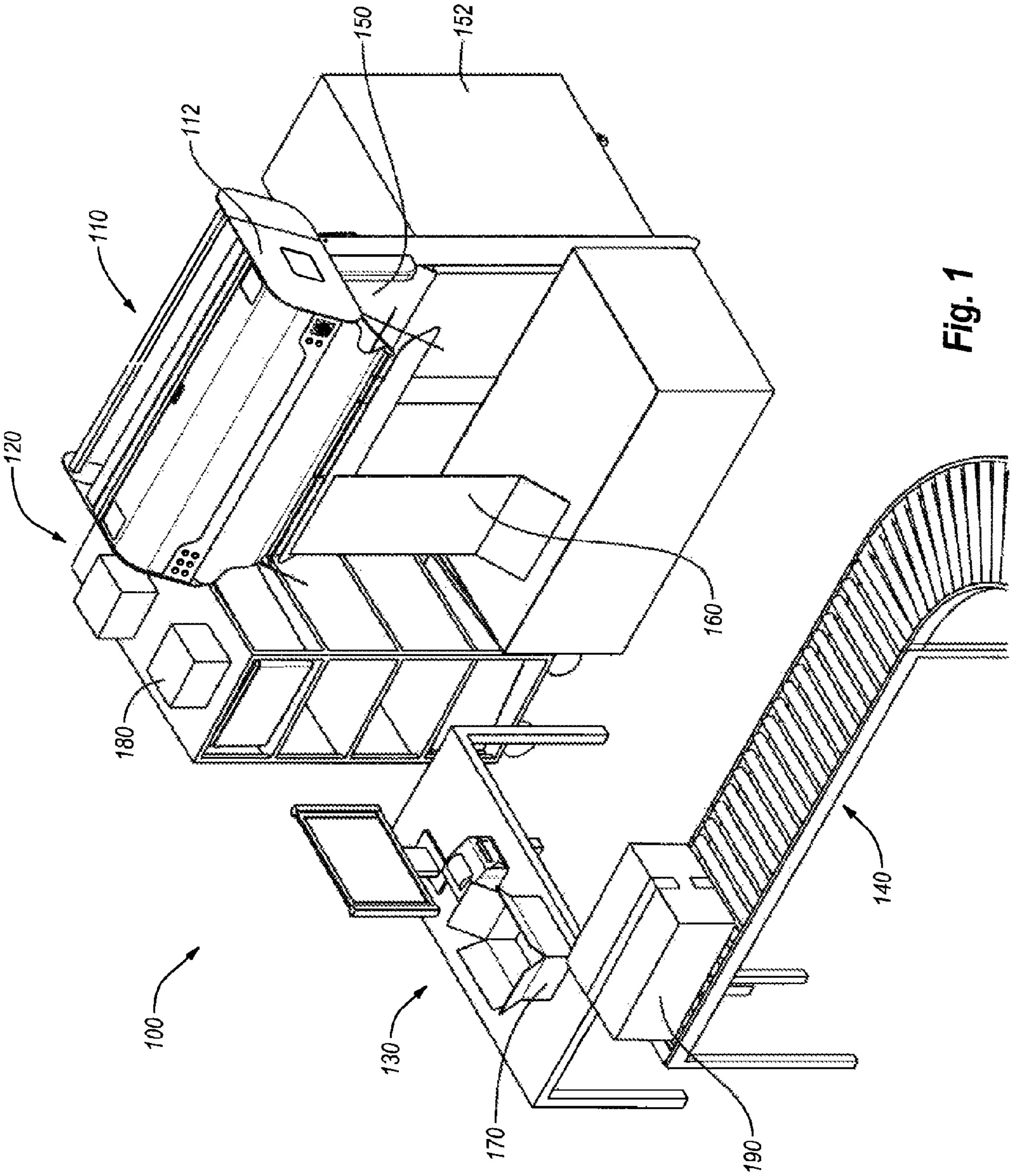
FIG. 1 illustrates a packaging cell as described in one aspect of this disclosure.

Generally, as illustrated in FIG. 1, a shipper can have one or more packaging cells 100, which can include equipment for packaging available orders and preparing the same for shipment. For example, the packaging cell 100 can include a packaging system 110, an available-order transport system 120, a work area 130, and a processed-order transport system 140. The packaging system 110 can include a converting machine 112 that can receive fanfold material 150 from one or more bales 152. The packaging system 110 can process the fanfold material 150 into packaging templates 160. An operator can retrieve the packaging templates 160 from the packaging system 110 and can form boxes 170 for shipment of available orders 180. As used herein, the term "available order" refers to any order (whether a single-item order or multi-item order) that can be processed as one unit by the shipper.

The available-order transport system 120 can transport various available orders 180 to the work area 130 for packaging and preparation for shipment. In some embodiments, the available-order transport system 120 can be a conveyor system or movable shelving system that can transport the available orders 180 to the work area 130. When the available orders 180 arrive at the work area 130, the operator can request packaging templates 160 to be prepared by the packaging system 110. As further described below, such packaging templates 160 can be custom-sized based on the particular dimensions of the available orders 180 to be packaged.

In addition to packaging the available orders 180, the operator can prepare the available orders 180 for shipment by attaching required labels and other materials. Once the available order 180 is processed (i.e., packaged and/or prepared for shipment), such processed order 190 can be transported away from the work area 130 via the processed-order transport system 140. For instance, the processed-order transport system 140 can transport the processed orders 190 to a shipping area. In some implementations, the processed-order transport system 140 can be a conveyor belt that can connect the work area 130 and a desired location for the processed orders 190. In other embodiments, the processed-order transport system 140 can be a movable shelving system that can transport the processed orders 190 away from the work area 130.

Figure 2:
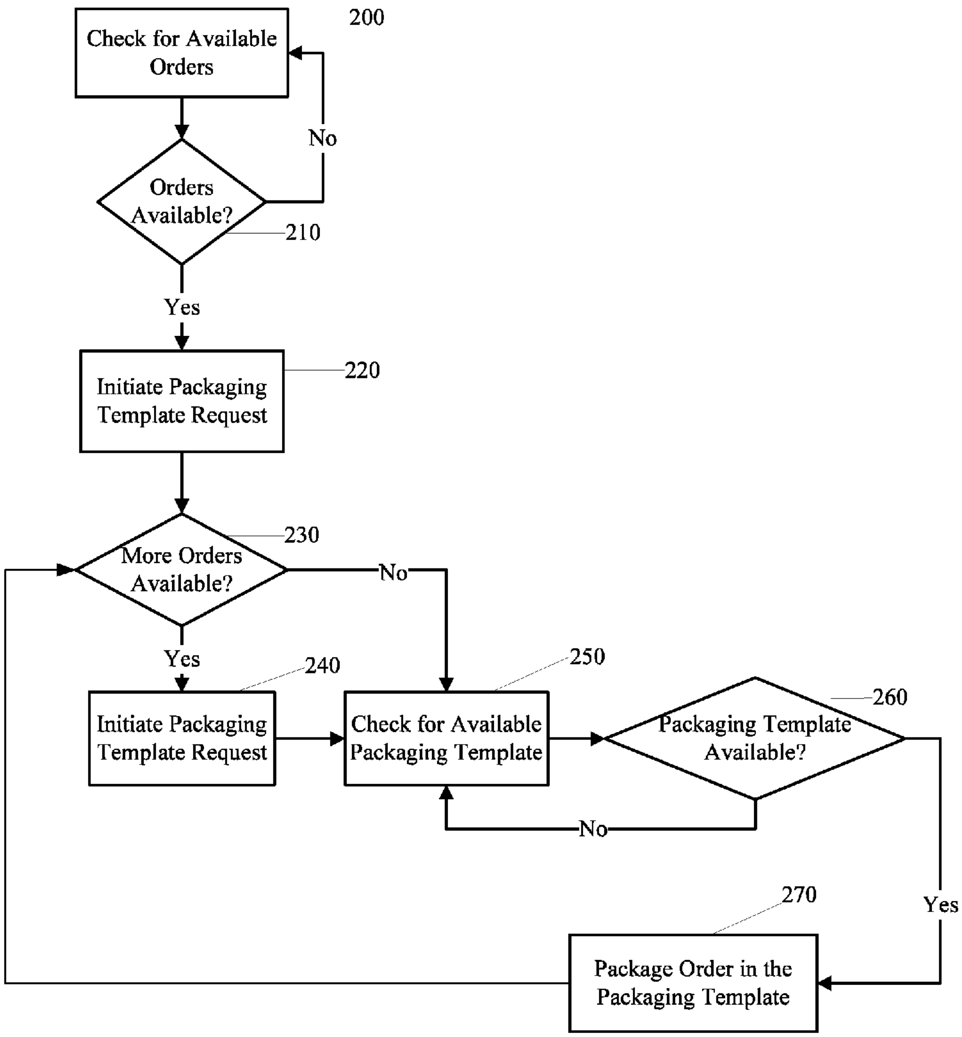
FIG. 2 illustrates a flow chart of an exemplary process for packaging multiple orders as described in one aspect of this disclosure.

As illustrated in FIG. 2, in some embodiments, to process available orders 180, check is made for available orders 180 at step 200. If it is determined at step 210 that an available order 180 has arrived at the work area 130, a request is initiated at step 220 for the creation of a packaging template 160 for the available order identified in step 210. The process for initiating the request for the creation of a packaging template 160 is discussed in further detail below.

After initiating the request in step 220, it is determined in step 230 whether there is an additional available order 180 at the work area 130. If so, a request is initiated at step 240 for the creation of another packaging template 160 for the additional available order 180 identified in step 230. After initiating the request for the additional packaging template 160 identified in step 240, or when it is determined at step 230 that there is not an additional available order 180, a check is made in step 250 to determine whether the packaging system 110 has completed the creation of the packaging template for the initial order identified in step 210. If the requested packaging template 160 for the order identified in step 210 is available, as determined in step 260, the order identified in step 210 is packaged in step 270 using the packaging temple 160 requested in step 220. The packaging of an available order in a packaging template 160 is discussed in greater detail below.

After the initial available order identified in step 210 is packaged, the process returns to step 230 and cycles through again. Specifically, the process returns to step 230 to determine whether yet another available order 180 has arrived at the work area 130, in which case a request is initiated at step 240 for the creation of a packaging template 160 for the available order identified in the second occurrence of step 230. The process then moves to step 250 for the second time, where it is determined whether the packaging system 110 has completed the creation of the packaging template for the available order 180 identified during the first occurrence of step 230. If the requested packaging template 160 for the order identified in the first occurrence of step 230 is available, as determined in step 260, the order identified in the first occurrence of step 230 is packaged in step 270 using the packaging temple 160 requested in step 240.

The process illustrated in FIG. 2 can continue to cycle through steps 230-270 so long as there are additional orders at the work area 130 that need to be packaged. If no additional orders are identified in step 230, the orders that are already at the work area 130 and which have not been packaged may be packaged using the packaging templates 160 requested in connection therewith.

Figure 3:
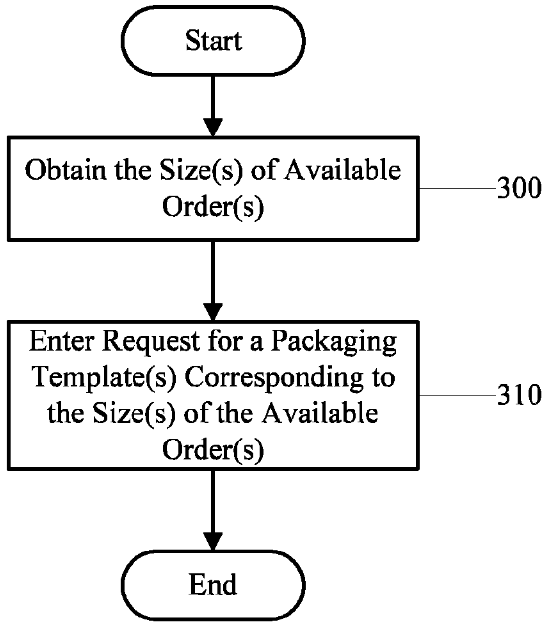
FIG. 3 illustrates a flow chart of exemplary sub-steps of the process shown in FIG. 2.

As described above, the packaging cell 100 can be operated in a manner that the packaging templates 160 are custom sized to the available orders 180 that arrive at the work area 130. As noted above, and as indicated in FIG. 2 at steps 220, 240, the packaging of available orders 180 in custom sized packages can begin by initiating a request for the creation of a custom sized packaging template 160. The initiation of the process can include multiple steps. As illustrated in FIG. 3, for example, initiation of the process can include obtaining the sizes of the available orders 180 (step 300) and requesting packaging templates 160 to be prepared based on the sizes of the available orders 180 (step 310).

For example, to obtain the sizes of the available orders 180, the available orders 180 can be measured, such as with a measuring tape, laser measuring device, or the like. Alternatively, the available order 180 can have a tracking number, such as a barcode, that can be associated with information related to the available order 180, including the size and/or shape of the available order, as well as other packaging requirements (e.g., needed padding). Thus, barcode can be scanned to obtain the size as well as other relevant parameters of the available order 180 (step 300). Furthermore, based on the obtained measurements and/or other information relating to the available order 180, a computer system can request a packaging template 160 be prepared by the packaging system 110 that corresponds to the size of the available order 180, as indicated in step 310.

Figure 4:
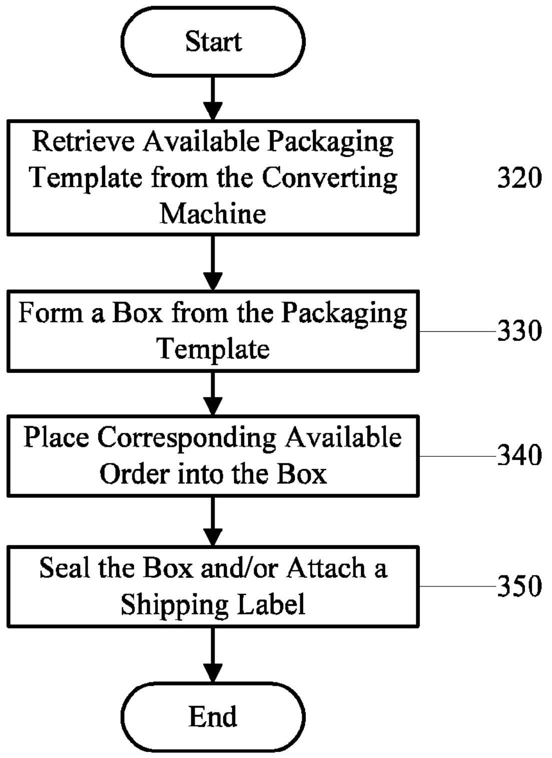
FIG. 4 illustrates yet another flow chart of exemplary sub-steps of the process shown in FIG. 2.

As described above, and as indicated in FIG. 2 at step 270, when the packaging template 160 is available, the packaging process can be completed by packaging the available order 180 using the packaging template 160 that corresponds to the available order 180. FIG. 4 illustrates exemplary steps is completing the packaging process for an available order. As shown, this portion of the packaging process can begin with retrieving the available packaging template 160 from the packaging system 110 (step 320). The retrieved packaging template 160 is them formed into a box 170 in step 330. In step 340, the available order 180 is placed in the box 170. Next, in step 350, the box 170 is closed and/or sealed and any needed labels, such as shipping labels, are placed on the box 170. Once the available order 180 is processed, the processed order 190 can be transported away from the work area 130 via the processed-order transport system 140.

Figure 5:
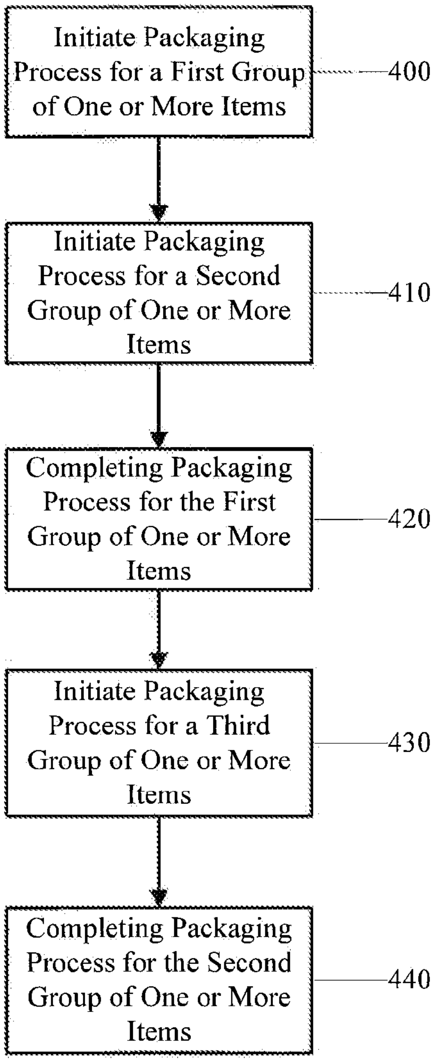
FIG. 5 illustrates a flow chart of an exemplary process for packaging multiple groups of one or more items as described in one aspect of this disclosure.

In some embodiments, as illustrated in FIG. 5, the packaging process can be initiated in step 400 for a first group of one or more items from the available orders 180. The initiation of the packaging process may be similar or identical to that shown in and discussed in connection with FIG. 3. As used herein, the term "items" refers to any item that is individually identifiable within an available order. For example, an order may comprise two items that can be packaged in the same or in two separate boxes, depending on the shipper's preferences. In addition to the above description, initiating the packaging process also can include creating the packaging template 160, which can be assembled into the box 170, custom-sized for one or more available orders 180 or for one or more items within one or more of the available orders 180.

After initiating the packaging process for the first group of items, the packaging process for a second group of one or more items from the available orders 180 can be initiated in step 410. Subsequently, the packaging process for the first group of one or more items can be completed in step 420. As described above, completing the packaging process can include packaging the items or the available orders 180 within the box 170. Thereafter, the packaging process for a third group of one or more items from the available orders 180 can be initiated in step 430. After initiated the packaging process for the third group of items, the packaging process for the second group of one or more items from the available orders 180 can be completed in step 440.

While not illustrated, the packaging process can continue for any number of groups of items in the same manner as described above. For instance, the packaging process for a fourth group of one or more items from the available orders 180 can be initiated, after which the packaging process for the third group of one or more items can be completed.

Figure 6:
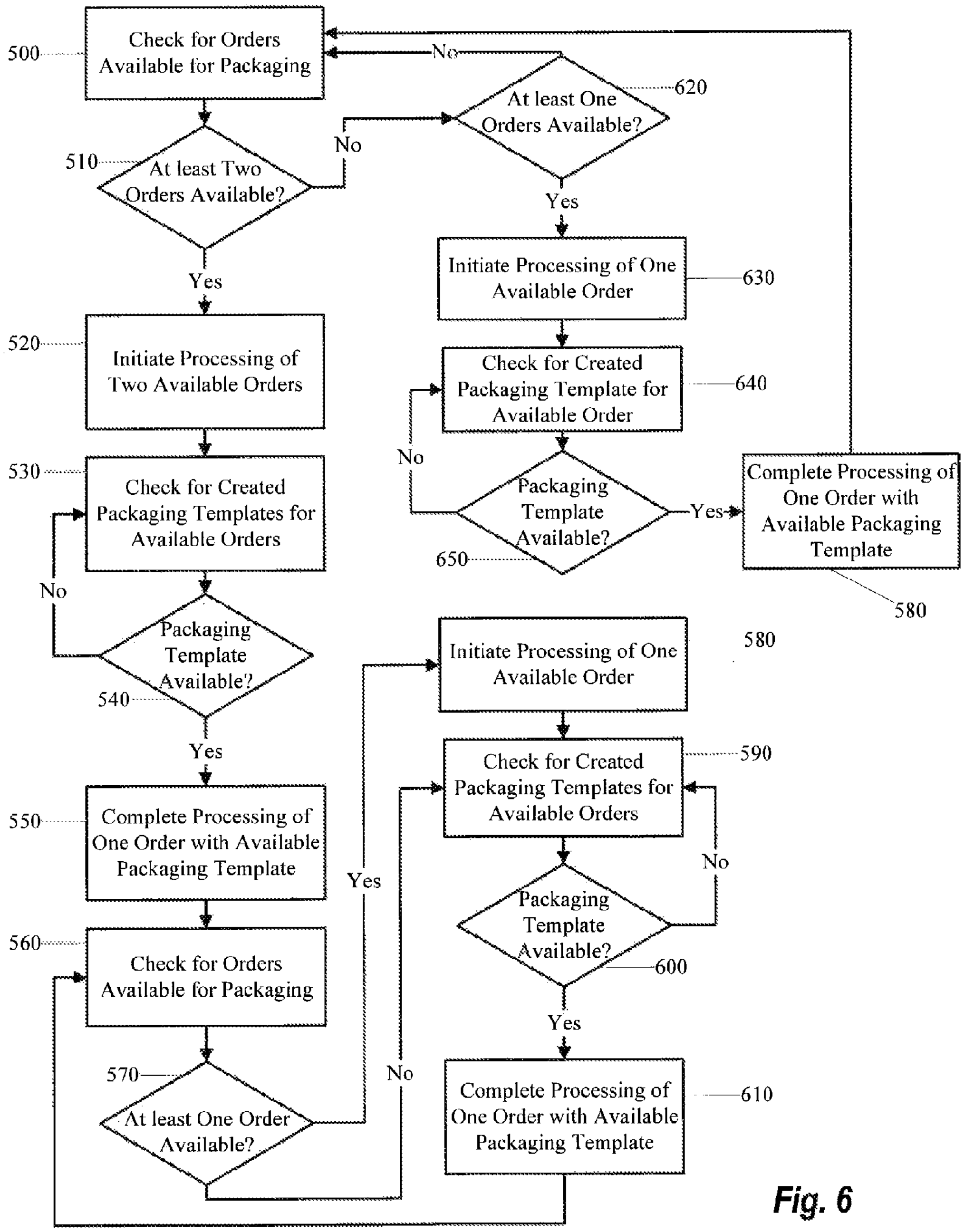
FIG. 6 illustrates a flow chart of another exemplary process for packaging multiple groups of one or more items as described in one aspect of this disclosure.

Additionally or alternatively, as illustrated in FIG. 6, the operator can check whether there are available orders 180 within the packaging cell 100 (step 500). If there are at least two available orders 180 within the packaging cell 100 (step 510), the operator can initiate the processing of two available orders 180 (step 520), as described above. Subsequently, the operator can check whether the packaging system 110 prepared packaging templates 160 for at least one of the initiated orders (step 530). If at least one packaging template 160 is available, the operator can complete the processing of one of the available orders 180 (step 550), as described above.

After completing processing of one of the available orders 180, the operator can check whether additional available orders 180 are present within the packaging cell 100 (step 560). If at least one available order 180 is present within the packaging cell 100 (step 570), the operator can initiate the packaging process for one of the additional available orders 180 (step 580). Subsequently, the operator can check whether the packaging system 110 has prepared at least one packaging template 160, which can be used to package one of the available orders 180 (steps 590, 600). If there is at least one packaging template 160 that is available for packaging at least one of the available orders 180, the operator can complete the processing of the available order 180 that corresponds with the available packaging template 160 (step 610). After completing the step 610, the operator can check whether additional available orders 180 are present within the packaging cell 100 (step 560).

If at the outset of the process there is only one available order 180 within the packaging cell 100 (steps 500, 510, 620), the operator can initiate processing of the one available order 180 (step 630). Subsequently, the operator can check whether the packaging template 160 has been prepared for the available order 180 (step 640) and, if the packaging template 160 is available (step 650), the operator can complete processing of the order (step 660). After the operator has completed the order (step 660), the operator can once again check for more available orders (step 500).

Figure 7:
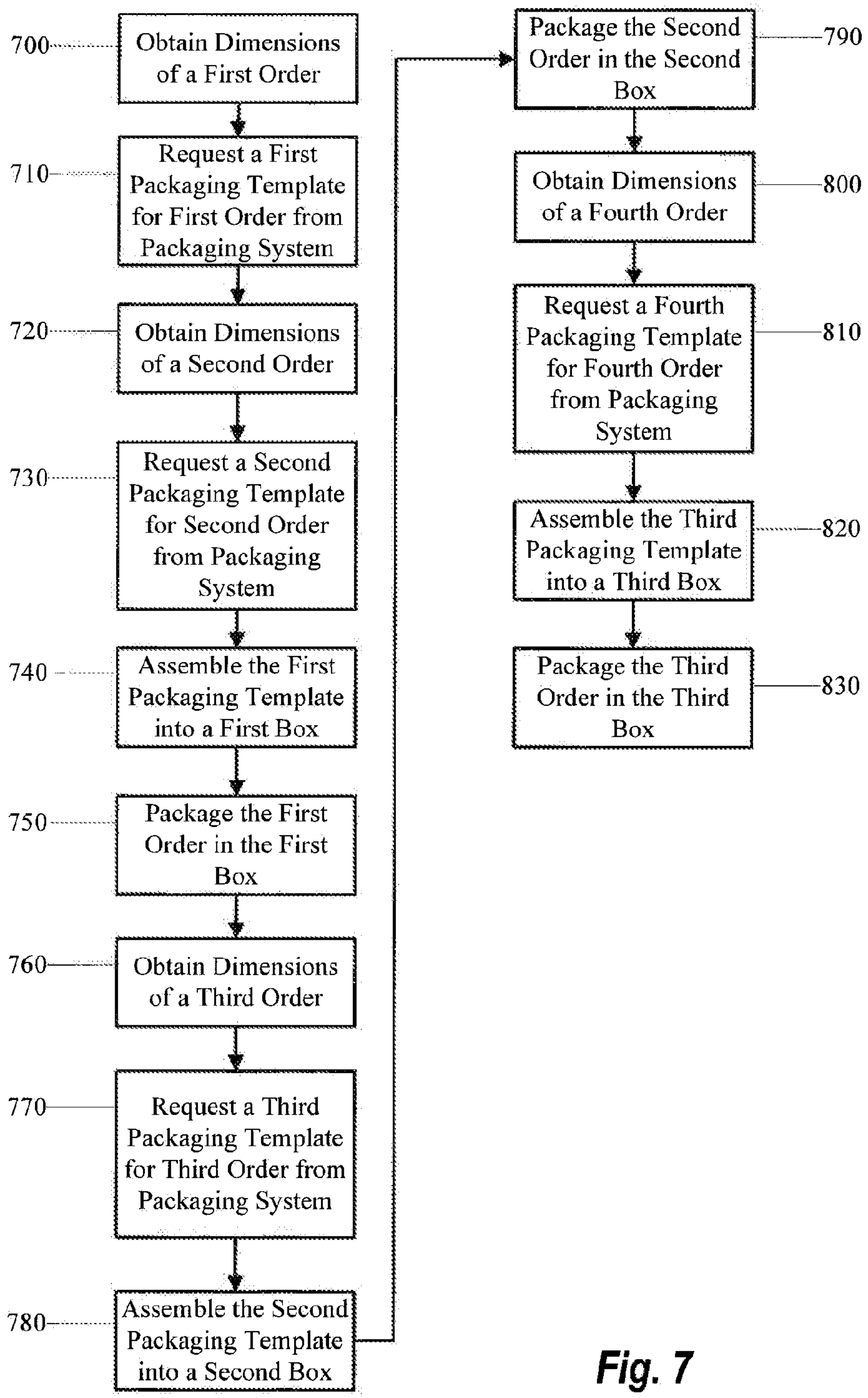
FIG. 7 illustrates a flow chart of still another exemplary process for packaging orders as described in one aspect of this disclosure.

In yet another embodiment, as illustrated in FIG. 7, the operator can obtain dimensions of a first available order 180 (step 700), as described above. Subsequently, the operator can request a first packaging template 160 from the packaging system 110 for packaging the first available order 180 (step 710). After requesting the first packaging template 160, the operator can obtain dimensions of a second available order 180 (step 720) and can request a second packaging template 160 for the second available order 180 (step 730).

After requesting the second packaging template 160, the operator can assemble the first packaging template 160 into a first box 170 (step 740) and can package the first available order 180 in the first box 170 (step 750). Subsequently, the operator also can obtain dimensions of a third available order 180 (step 760) and can request a third packaging template 160 from the packaging system 110 for packaging the third available order 180 (step 770). After requesting the third packaging template 160, the operator can assemble the second packaging template 160 into a second box 170 (step 780) and can package the second available order 180 in the second box 170 (step 790).

After completing the step 790, the operator also can obtain dimensions of a fourth available order 180 (step 800) and can request a fourth packaging template 160 from the packaging system 110 for packaging the fourth available order 180 (step 810). After requesting the fourth packaging template 160, the operator can assemble the third packaging template 160 into a third box 170 (step 820) and can package the third available order 180 in the third box 170 (step 830).

Furthermore, the operator can continue to operate within the packaging cell 100 in the same manner as described above. For instance, the operator can obtain dimensions of a fifth available order 180 and can request a fifth packaging template 160 from the packaging system 110 for packaging the fifth available order 180. The operator also can assemble the fourth packaging template 160 into a fourth box 170 and can package the fourth available order 180 in the fourth box 170, and so on.

In light of this disclosure, those skilled in the art should appreciate various methods of packaging that can be used in conjunction with the methods and systems described herein. For instance, the operator can assemble the packaging templates 160 into boxes 170 by securing various portions of the packaging templates 160 with an adhesive tape or staples. Additionally or alternatively, one operator can assembly the packaging templates 160 into boxes 170 and place the available orders 180 into the assembled boxes 170, and another operator can secure various portions of the boxes 170 with an adhesive tape.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method for packaging multiple groups of one or more items using packaging templates that are assembled into custom sized boxes, the method comprising:
- initiating a packaging process for a first group of one or more items;
- initiating a packaging process for a second group of one or more items;
- completing the packaging process for the first group of one or more items after initiating the packaging process for the second group of one or more items;
- initiating a packaging process for a third group of one or more items after completing the packaging process for the first group of one or more items;
- completing the packaging process for the second group of one or more items after initiating the packaging process for the third group of one or more items.

2. The method of claim 1, further comprising initiating a packaging process for a fourth group of one or more items prior to completing the packaging process for the third group of one or more items.

3. The method of claim 2, wherein initiating the packaging process for the fourth group of one or more items is done after completing the packaging process for the second group of one or more items.

4. The method of claim 1, wherein initiating a packaging process comprises measuring dimensions of the group of one or more items.

5. The method of claim 1, wherein initiating a packaging process comprises scanning one or more barcodes associated with the group of one or more items.

6. The method of claim 1, wherein initiating a packaging process comprises creating a packaging template that is configured to be assembled into a box that is custom sized for the group of one or more items.

7. The method of claim 1, wherein completing a packaging process comprises assembling a packaging template into a box that is custom sized for the group of one or more items.

8. The method of claim 7, wherein completing a packaging process comprises packaging the group of one or more items in the custom sized box.

9. A method for utilizing a converting machine in a packaging system for packaging orders, the method comprising:
- checking for orders available for packaging and, if available, initiating two available orders for processing, including requesting the creation by said converting machine of packaging templates for the two available orders;
- checking for a created packaging template for at least one of the two available orders and, if available, completing the processing of the at least one of the two available orders;
- checking for orders available for packaging and, if available, initiating one available order for processing, including requesting the creation by said converting machine of a packaging template for the one available order after completing the processing of the at least one of the two available orders;
- checking for a created packaging template for the other of the two available orders and, if available, completing the processing of the other of the two available orders after initiating the processing for the one available order; and
- checking for a created packaging template for the one available order and, if available, completing the processing of the one available order.

10. The method of claim 9, wherein completing the processing for an available order comprises forming a box from the created packaging template and packaging the available order in the box.

11. The method of claim 10, wherein completing the processing further comprises attaching a shipping label to the box.

12. The method of claim 9, wherein the method is performed within a packaging cell.

13. The method of claim 12, wherein the packaging cell comprises said converting machine and a work area.

14. The method of claim 13, wherein the packaging cell further comprises one or more of an available-order transport system and processed-order transport system.

15. The method of claim 14, wherein after completing the processing, orders are transported out of the packaging cell using the processed-order transport system.

16. The method of claim 14, wherein the orders available for packaging are transported to the packaging cell using the available-order transport system.

17. A method for utilizing a packaging system for requesting packaging materials, assembling packages, and preparing packages for shipment, the method comprising:

obtaining dimensions of a first order;

requesting a first packaging template to be prepared by said packaging system based on the obtained dimensions of the first order;

obtaining dimensions of a second order;

requesting a second packaging template to be prepared by said packaging system based on the obtained dimensions of the second order;

assembling the first packaging template into a first box and packaging the first order therein after requesting a second packaging template to be prepared;

obtaining dimensions of a third order after assembling the first packaging template in the first box and packaging the first order therein;

requesting a third packaging template to be prepared by said packaging system based on the obtained dimensions of the third order;

assembling the second packaging template into a second box and packaging the second order therein after requesting a third packaging template to be prepared;

obtaining dimensions of a fourth order after assembling the second packaging template in the second box and packaging the second order therein;

requesting a fourth packaging template to be prepared by said packaging system based on the obtained dimensions of the fourth order; and assembling the third packaging template into a third box and packaging the third order therein after requesting the fourth packaging template to be prepared.

18. The method of claim 17, further comprising:

obtaining dimensions of a fifth order; and requesting a fifth packaging template to be prepared by said packaging system based on the obtained dimensions of the fifth order.

19. The method of claim 18, further comprising:

assembling the fourth packaging template into a fourth box and packaging the fourth order therein.

20. The method of claim 17, wherein obtaining dimensions of an order is performed by scanning of a barcode.

21. A system for packaging multiple groups of one or more items, the system comprising:

a converting machine configured to make packaging templates that may be assembled into custom sized boxes;

an available-order transport system;

a work area; and a processed-order transport system, where the system is configured to:

initiate a packaging process for a first group of one or more items;

initiate a packaging process for a second group of one or more items;

complete the packaging process for the first group of one or more items after initiation of the packaging process for the second group of one or more items;

initiate a packaging process for a third group of one or more items after completing the packaging process for the first group of one or more items; and complete the packaging process for the second group of one or more items after initiation of the packaging process for the third group of one or more items.

* * * * *